US012573713B2

(12) United States Patent
Choi et al.

(10) Patent No.: US 12,573,713 B2
(45) Date of Patent: Mar. 10, 2026

(54) METHOD OF MANUFACTURING A SEPARATOR AND A SEPARATOR MANUFACTURED USING THE SAME

(71) Applicants: W-SCOPE KOREA CO., LTD., Cheongju-si (KR); W-SCOPE CHUNGJU PLANT CO., LTD., Chungju-si (KR)

(72) Inventors: Won Keun Choi, Cheongju-si (KR); Dae Bog Park, Cheonan-si (KR); Byung Tak Jung, Cheonan-si (KR); Byung Hyun Kim, Cheongju-si (KR)

(73) Assignees: W-SCOPE KOREA CO., LTD., Cheongju-si (KR); W-SCOPE CHUNGJU PLANT CO., LTD., Chungju-si (KR)

( * ) Notice: Subject to any disclaimer, the term of this patent is extended or adjusted under 35 U.S.C. 154(b) by 719 days.

(21) Appl. No.: 17/856,296

(22) Filed: Jul. 1, 2022

(65) Prior Publication Data

US 2023/0207959 A1     Jun. 29, 2023

(30) Foreign Application Priority Data

Dec. 29, 2021     (KR) .......................... 10-2021-0191330

(51) Int. Cl.
*H01M 50/403*      (2021.01)
*H01M 50/449*      (2021.01)
*H01M 50/491*      (2021.01)

(52) U.S. Cl.
CPC ....... *H01M 50/403* (2021.01); *H01M 50/449* (2021.01); *H01M 50/491* (2021.01)

(58) Field of Classification Search
CPC .......................... H01M 50/403; H01M 50/406
See application file for complete search history.

(56) References Cited

U.S. PATENT DOCUMENTS

| | | | | |
|---|---|---|---|---|
| 2011/0195294 A1* | 8/2011 | Lee | ..................... | H01M 50/457 |
| | | | | 156/247 |
| 2017/0125761 A1* | 5/2017 | Shiba | .................. | H01M 50/457 |
| 2018/0169881 A1* | 6/2018 | Watanabe | .............. | B26D 1/035 |

FOREIGN PATENT DOCUMENTS

| | | |
|---|---|---|
| JP | 2013-064116 A | 4/2013 |
| JP | 2016-038934 A | 3/2016 |
| JP | 2016-043305 A | 4/2016 |
| KR | 10-1029672 B1 | 4/2011 |

(Continued)

OTHER PUBLICATIONS

KR20140007752A translation (Year: 2014).*
KR20150091973A translation (Year: 2015).*

(Continued)

*Primary Examiner* — Allison Bourke
*Assistant Examiner* — Travis L. Martin
(74) *Attorney, Agent, or Firm* — Studebaker Brackett PLLC

(57) ABSTRACT

One aspect of the present invention provides a method of manufacturing a separator including: (a) obtaining a laminate by laminating a first porous support and a second porous support; (b) forming a functional layer by applying a composition including a binder and a solvent on both sides of the laminate and drying the composition; and (c) dividing the laminate into two separators along an interface formed by the lamination, and a separator manufactured using the method.

7 Claims, 2 Drawing Sheets

(56)  References Cited

FOREIGN PATENT DOCUMENTS

| KR | 20140007752 | A | * | 1/2014 |
| KR | 20150091973 | A | * | 8/2015 |

OTHER PUBLICATIONS

An Office Action mailed by the Korean Intellectual Property Office on Jul. 1, 2024, which corresponds to Korean Patent Application No. 10-2021-0191330 and is related to U.S. Appl. No. 17/856,296.

* cited by examiner

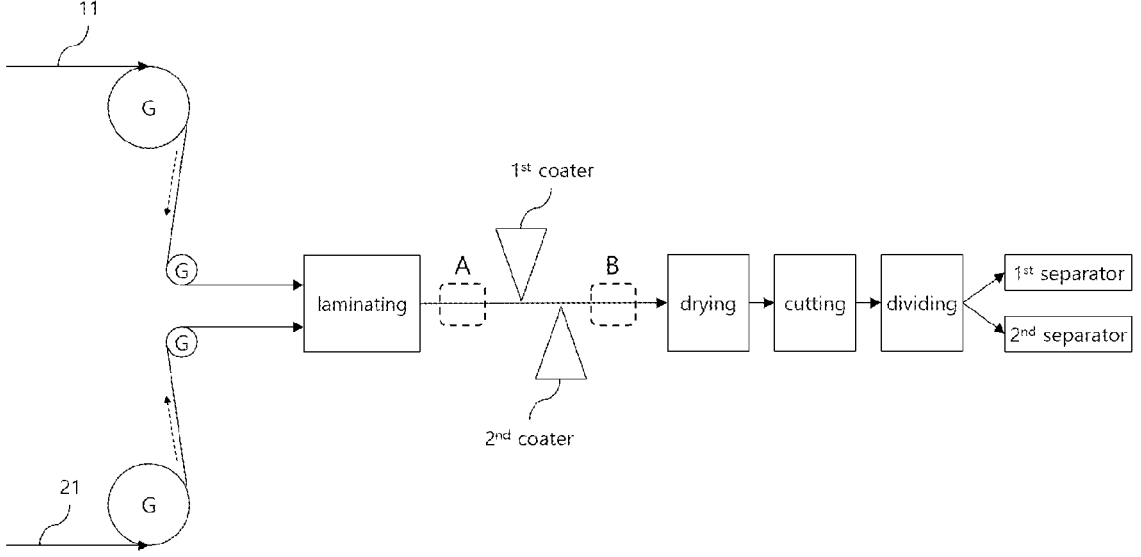
FIG. 1
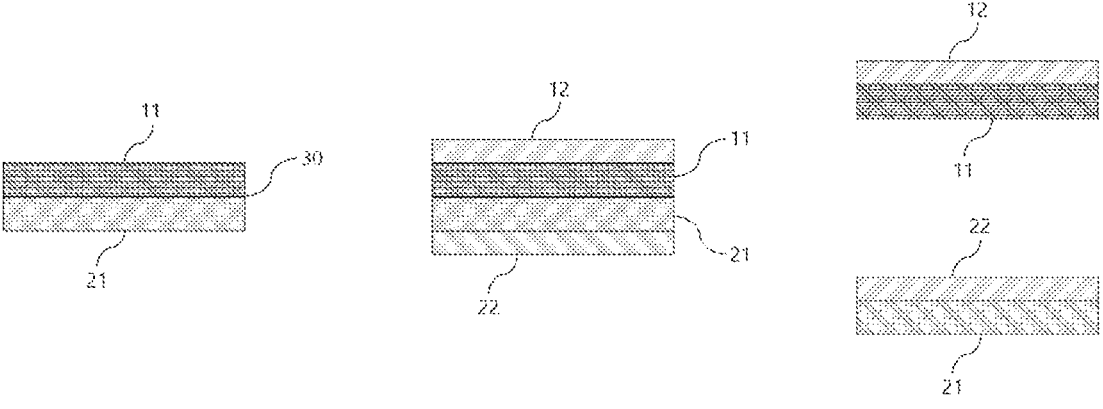
FIG. 2A                    FIG. 2B                    FIG. 2C

METHOD OF MANUFACTURING A SEPARATOR AND A SEPARATOR MANUFACTURED USING THE SAME

CROSS-REFERENCE TO RELATED APPLICATION

This application claims priority to and the benefit of Korean Patent Application No. 10-2021-0191330, filed on Dec. 29, 2021, the disclosure of which is incorporated herein by reference in its entirety.

BACKGROUND

1. Field of the Invention

The present invention relates to a method of manufacturing a separator and a separator manufactured using the same.

2. Discussion of Related Art

Lithium secondary batteries are widely used as power sources for various electric products that are required to be miniaturized and lightweight, such as smart phones, notebook-sized personal computers, and tablet PCs, and as the fields of application thereof have expanded to smart grids and heavy-duty batteries for electric vehicles, the development of lithium secondary batteries having a large capacity, a long life, and high stability has been demanded.

As a means for achieving the above-mentioned object, research and development are being actively carried out on a microporous separator using a microporous membrane formed with micropores that separates a positive electrode and a negative electrode to prevent an internal short circuit and allow lithium ions to move smoothly in a charging and discharging process, particularly a polyolefin such as polyethylene which is advantageous for pore formation by thermally induced phase separation and which is economical and easy to satisfy the physical properties required for the separator.

However, a separator using polyethylene having a low melting point of about 135° C. may undergo shrinkage deformation at a high temperature higher than the melting point due to heat generation of the battery. When a short circuit occurs due to such deformation, a thermal runaway phenomenon of the battery may occur, resulting in safety problems such as ignition.

In order to improve the heat resistance of the separator, a separator in which ceramic particles are coated on the surface of a porous support, a so-called ceramic coated separator, has been proposed. However, the ceramic-coated separator causes significant technical challenges in relation to air permeability. That is, when a heat-resistant layer containing ceramic particles is coated on the surface of the porous support, the heat resistance of the separator is improved, but the heat resistant layer closes the pores formed in the porous support to reduce the air permeability of the separator, thereby reducing the ion transfer passage between the positive electrode and the negative electrode, resulting in a problem that the charging and discharging performance of the battery is greatly reduced.

Meanwhile, attempts have been made to improve adhesion with the electrode and extend the life of the battery by additionally forming an adhesive layer having adhesion to the electrode on the surface of the porous support and/or the surface of the heat-resistant layer.

A separator coated with a functional layer such as a heat-resistant layer and an adhesive layer is generally prepared by applying and drying a composition for forming the functional layer on one or both sides of the porous support while the porous support travels at a constant speed.

In the case of a porous support having a conventional thickness of about 20 μm, workability for the coating process, specifically, mechanical properties of the porous support and traveling stability thereof were properly secured. However, with increasing demand for large capacity batteries in recent years, the thickness of the porous support is also reduced to about 15 μm or less, and due to such a reduction in thickness, the mechanical properties and the resulting traveling stability of a porous support are unavoidably reduced, and thus there is a problem that deformation such as wrinkles and sagging occurs in the porous support during application and drying of a liquid composition for forming the functional layer. In this regard, a method of improving workability by reducing the traveling speed of the porous support during coating has been proposed, but since the traveling speed is a factor that directly affects the productivity of the separator, there is a problem in that productivity is significantly reduced.

SUMMARY OF THE INVENTION

The present invention has been made in order to solve the problems of the related art described above, and an object of the present invention is to provide a method of manufacturing a separation membrane and a separation membrane produced using the same, in which a separator includes a functional layer such as a heat-resistant layer and an adhesive layer coated on one surface of a porous support, whereby productivity and quality of the separator can be realized in a balanced manner and improved.

One aspect of the present invention provides a method of manufacturing a separator, including: (a) obtaining a laminate by laminating a first porous support and a second porous support; (b) forming a functional layer by applying a composition including a binder and a solvent on both sides of the laminate and drying the composition; and (c) dividing the laminate into two separators along an interface formed by the lamination, and a separator manufactured using the method.

In one embodiment, the thickness of the first porous support and the second porous support may each be 15 μm or less.

In one embodiment, the each of the first porous support and the second porous support may include one selected from the group consisting of polyethylene, polypropylene, polybutylene, polymethylpentene, ethylene vinyl acetate, ethylene butyl acrylate, ethylene ethyl acrylate, and combinations or copolymers of two or more thereof.

In one embodiment, the binder may be one selected from the group consisting of polyvinylidene fluoride, polyvinylidene fluoride-hexafluoropropylene, polyvinylidene fluoride-trichloroethylene, polymethyl methacrylate, polyacrylonitrile, polyvinylpyrrolidone, polyvinyl acetate, ethylene vinyl acetate, polyimide, polyethylene oxide, cellulose acetate, cellulose acetate butyrate, cellulose acetate propionate, cyanoethyl pullulan, cyanoethyl polyvinyl alcohol, cyanoethyl cellulose, hydroxyethyl cellulose, cyanoethyl sucrose, pullulan, carboxymethyl cellulose, polyvinyl alcohol, polyvinyl butyral, an acrylonitrile-acrylic acid copolymer, an ethylene-acrylic acid copolymer, a styrene-butadiene copolymer, an alkyl acrylate-acrylonitrile copolymer, polyethylene glycol, acrylic rubber, and a combination of two or more thereof.

In one embodiment, the solvent may be one selected from the group consisting of methanol, ethanol, propanol, butanol, methoxyethanol, ethoxyethanol, lactone, acetonitrile, n-methyl-2-pyrrolidone (NMP), formic acid, nitromethane, acetic acid, dimethyl sulfoxide, water, and combinations of two or more thereof.

In one embodiment, the composition may further include one of inorganic particles selected from the group consisting of $SiO_2$, $AlO(OH)$, $Mg(OH)_2$, $Al(OH)_3$, $TiO_2$, $BaTiO_3$, $Li_2O$, $LiF$, $LiOH$, $Li_3N$, $BaO$, $Na_2O$, $Li_2CO_3$, $CaCO_3$, $LiAlO_2$, $Al_2O_3$, $SiO$, $SnO$, $SnO_2$, $PbO_2$, $ZnO$, $P_2O_5$, $CuO$, $MoO$, $V_2O_5$, $B_2O_3$, $Si_3N_4$, $CeO_2$, $Mn_3O_4$, $Sn_2P_2O_7$, $Sn_2B_2O_5$, $Sn_2BPO_6$, and combinations of two or more thereof.

In one embodiment, the first porous support and the second porous support may be pressed to face each other during the lamination, and both ends of the first porous support and the second porous supports in the transverse direction (TD) may be attached to each other.

In one embodiment, the ratio of the area of both ends of the first porous support and the second porous support in the transverse direction (TD) to the area of the interface may be 0.01 to 0.1.

In one embodiment, both ends of the first porous support and the second porous support in the transverse direction (TD) may be cut and removed.

Another aspect of the present invention provides a separator manufactured using the method of manufacturing a separator, and a separator in which the characteristics of the separator measured according to a method including: (i) connecting one end of the separator in the machine direction (MD) to a second member in which the separator is fixed in the horizontal direction while the center of the roll around which the separator is wound is fixed to a first member; and (ii) confirming deformation of the separator after 1 hour at a temperature of 25° C. and a humidity of 40% and measuring displacement in the vertical direction according to the deformation satisfy at least one of the following conditions (1) and (2).

(1) no deformation and no vertical displacement of the separator; (2) 5 or less of descending region occur in the separator in the vertical direction, and the distance between the plane where the separator is fixed in the horizontal direction and the lowermost stage of the descending region is 10% or less of the width in the transverse direction (TD) of the separator.

Effects of the Invention

The method of manufacturing a separator according to one aspect of the present invention may include: (a) obtaining a laminate by laminating a first porous support and a second porous support; (b) forming a functional layer by applying a composition including a binder and a solvent on both sides of the laminate and drying the composition; and (c) dividing the laminate into two separators along an interface formed by the lamination, thereby productivity and quality of the separator can be realized in a balanced manner and improved.

The effect of one aspect of the present specification is not limited to the above-described effect, but it should be understood to include all effects that can be inferred from the configuration described in the detailed description or claims of the present invention.

BRIEF DESCRIPTION OF THE DRAWINGS

FIG. 1 shows a method of manufacturing a separator according to an embodiment of the present invention.

FIGS. 2A to 2C show a cross section of a laminate corresponding to regions A and B of FIG. 1 and two divided separators.

DETAILED DESCRIPTION OF EXEMPLARY EMBODIMENTS

Figure 3:
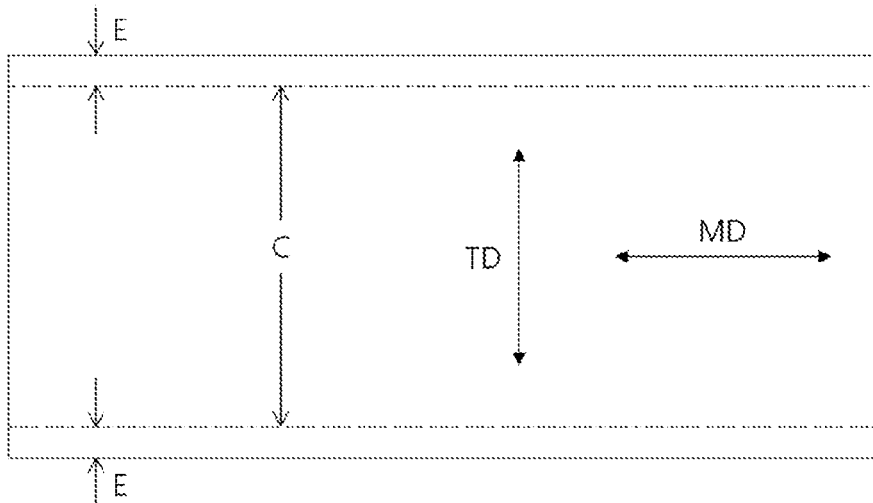
FIG. 3 is a plan view of a laminate according to another embodiment of the present invention.

Hereinafter, embodiments of the present invention will be described with reference to the accompanying drawings. However, the present invention may be implemented in several different forms, and thus is not limited to the embodiments described herein. In order to clearly illustrate the present invention in the drawings, parts irrelevant to the description are omitted, and the same reference numerals are added to the same or similar parts throughout the specification.

Throughout the specification, when a part is "connected" with another part, this includes not only the case where it is "directly connected," but also the case where it is "indirectly connected" with another member interposed therebetween. In addition, when a part is said to "include" a component, this means that other components may be further included, not excluded, unless specifically stated otherwise.

Hereinafter, embodiments of the present invention will be described in detail with reference to the accompanying drawings.

Method of Manufacturing a Separator

FIG. 1 shows a method of manufacturing a separator according to an embodiment of the present invention, and FIGS. 2A to 2C show a cross section of a laminate corresponding to regions A and B of FIG. 1 and two divided separators.

Referring to FIG. 1, a method of manufacturing a separator according to an embodiment of the present invention may include: (a) laminating a first porous support and a second porous support to obtain a laminate; (b) forming a functional layer by applying a composition including a binder and a solvent on both sides of the laminate and drying the composition; and (c) dividing the laminate into two separators along an interface formed by the lamination.

A laminate may be obtained by laminating the first and the second porous supports in step (a). The first and the second porous supports may be a type of porous membrane with pores formed therein, and the first and the second porous supports may have the same material and physical properties, and at least one of them may be different.

The first and the second porous supports are prepared by extruding a raw material including a polyolefin and a pore former, discharging the material through a T-die to mold into a sheet form, and then stretching the material, and extracting and removing the pore former included in the raw material.

The weight average molecular weight of the polyolefin may be 300,000 to 2,000,000, preferably, 300,000 to 1,000, 000, more preferably, 300,000 to 700,000, and molecular weight distribution (Mw/Mn) may be 3 to 7. When the weight average molecular weight of the polyolefin is more than 2,000,000, viscosity may increase and processability may be lowered, and when it is less than 300,000, viscosity may be excessively low so that the dispersibility of the raw material is lowered or the mechanical and/or thermal properties of the separator may be lowered. In addition, when the molecular weight distribution of the polyolefin is less than 3, the dispersibility of the polyolefin and the pore former may be reduced, so that the uniformity of pores in the separator may be reduced, and when it is more than 7, the mechanical properties of the separator may be reduced.

The polyolefin may include one selected from the group consisting of polyethylene, polypropylene, polybutylene, polymethylpentene, ethylene vinyl acetate, ethylene butyl acrylate, ethylene ethyl acrylate, and combinations or copolymers of two or more thereof, preferably, it may include polyethylene and/or polypropylene, and more preferably, it may include polyethylene, but is not limited thereto.

Each of the first and the second porous supports may have a thickness of 15 μm or less, preferably, 1 to 15 μm, more preferably, 1 to 10 μm, but is not limited thereto. When the thickness of the first and the second porous supports is less than 1 μm, the mechanical and/or thermal properties of each of the first and the second porous supports may be lowered, and the mechanical and/or thermal properties of the laminate in which they are laminated may be reduced, and thus traveling stability in the coating line may be deteriorated. Conversely, when the thickness of the first and the second porous supports exceeds 15 μm, it is not suitable for increasing the capacity of the battery and thus thinning the separator.

FIG. 2A is a cross-sectional view of a laminate corresponding to region A of FIG. 1. Referring to FIG. 2A, the laminate may include the first and the second porous supports laminated to face each other based on a predetermined interface. The lamination can be carried out continuously by means of a lamination machine including a guide means, e.g., guide rolls, which unwind the first and the second porous supports cut to the same width and wound so as to oppose each other, and a pressing means, such as pressing rolls, driven in the machine direction (MD).

FIG. 3 is a plan view of a laminate according to another embodiment of the present invention. Referring to FIG. 3, the first and the second porous supports are pressed to face each other during lamination, and both ends of the first and the second porous supports in the transverse direction (TD) may be attached to each other. The attachment can be made by a physical means such as heat, ultrasonic waves, high frequency, and laser selectively applied to both ends in the transverse direction (TD) of the first and the second porous supports, and the attachment can improve the traveling stability and coating workability of the laminate passing through the coating line, thereby more effectively preventing a sagging phenomenon and the like seen in conventional coating separators.

A ratio of the area of both ends of the first and the second porous supports in the transverse direction (TD) to the area of the interface may be 0.01 to 0.1. When the ratio of the area of both ends of the first and the second porous supports in the transverse direction (TD) to the area of the interface is less than 0.01, traveling stability and coating workability cannot be adequately improved.

Meanwhile, in a subsequent process, both ends of the first and the second porous supports in the transverse direction (TD) may be cut and removed so that the laminate is smoothly divided. Both ends of the removed first and the second porous supports in the transverse direction (TD) are generally discarded, and when the ratio of the area of both ends of the first and the second porous supports in the transverse direction (TD) to the area of the interface is greater than 0.1, the amount of waste of the first and the second porous supports may increase, thereby reducing productivity.

In particular, even when both ends of the first and the second porous supports in the transverse direction (TD) are not attached to each other, as the composition is applied relatively thick by surface tension at that site, a so-called heavy edge, which must be cut and removed after application and drying, occurs. Therefore, the attachment, cutting, removal and the like of the corresponding site according to the present invention do not adversely affect the productivity of the separator, and this site, which is inevitably discarded, is applied as a means for improving coating workability, and can rather contribute to improving productivity.

In step (b), a composition (slurry) including a binder and a solvent is applied to both sides of the laminate and dried to remove the solvent and other liquid residues included in the composition at one time, thereby forming a functional layer. The composition applied to both sides of the laminate may have the same composition and physical properties, and at least one of them may be different.

FIG. 2B is a cross-sectional view of the laminate corresponding to region B of FIG. 1. Referring to FIGS. 1 and 2B, the coating line for applying the composition may include a first coater disposed above the laminate traveling therethrough and a second coater disposed below the laminate.

The upper surface of the first porous support and the lower surface of the second porous support may constitute both sides of the laminate. The first coater may apply a composition having a predetermined composition to the upper surface of the first porous support constituting the upper layer of the laminate to form a first functional layer, and the second coater can apply a composition having a predetermined composition to a lower surface of the second porous support forming the lower layer of a laminate to form a second functional layer.

The first and the second coaters may each be one selected from the group consisting of a roll coater, a bar coater, a spray coater, a die coater, a comma coater, and a combination of two or more thereof, and preferably, a roll coater and/or a bar coater, but is not limited thereto.

The binder may be one selected from the group consisting of polyvinylidene fluoride, polyvinylidene fluoride-hexafluoropropylene, polyvinylidene fluoride-trichloroethylene, polymethyl methacrylate, polyacrylonitrile, polyvinylpyrrolidone, polyvinyl acetate, ethylene vinyl acetate, polyimide, polyethylene oxide, cellulose acetate, cellulose acetate butyrate, cellulose acetate propionate, cyanoethyl pullulan, cyanoethyl polyvinyl alcohol, cyanoethyl cellulose, hydroxyethyl cellulose, cyanoethyl sucrose, pullulan, carboxymethyl cellulose, polyvinyl alcohol, polyvinyl butyral, an acrylonitrile-acrylic acid copolymer, an ethylene-acrylic acid copolymer, a styrene-butadiene copolymer, an alkyl acrylate-acrylonitrile copolymer, polyethylene glycol, acrylic rubber, and a combination of two or more thereof, and preferably, carboxymethyl cellulose and an alkyl acrylate-acrylonitrile copolymer, but is not limited thereto. For example, in the functional layer, the carboxymethyl cellulose and the alkyl acrylate-acrylonitrile copolymer are may be present in a weight ratio of 1:0.5 to 1.5.

The composition may further include one of inorganic particles selected from the group consisting of $SiO_2$, AlO(OH), $Mg(OH)_2$, $Al(OH)_3$, $TiO_2$, $BaTiO_3$, $Li_2O$, LiOH, $Li_3N$, BaO, $Na_2O$, $Li_2CO_3$, $CaCO_3$, $LiAlO_2$, $Al_2O_3$, SiO, SnO, $SnO_2$, $PbO_2$, ZnO, $P_2O_5$, CuO, MoO, $V_2O_5$, $B_2O_3$, $Si_3N_4$, $CeO_2$, $Mn_3O_4$, $Sn_2P_2O_7$, $Sn_2B_2O_5$, $Sn_2BPO_6$, and combinations of two or more thereof, and the inorganic particles may contribute to improving the heat resistance of the functional layer and the separator. The inorganic particles, preferably, may be $Al_2O_3$ and/or AlO(OH), but are not limited thereto.

The content of the inorganic particles in the functional layer may be 50 to 95% by weight. When the content of the inorganic particles in the functional layer is less than 50% by weight, the required level of heat resistance cannot be imparted, and when the content is more than 95% by weight, the dispersibility of the inorganic particles may decrease or coating workability and processability may decrease.

The inorganic particles tend to be agglomerated by binding by electrostatic attraction. Aggregation of such inorganic particles may inhibit the uniformity of physical properties on the surface of the separator. In this regard, the composition may further include an additive for improving the dispersibility of the inorganic particles, for example, a dispersant, a surfactant, and the like. In particular, the composition may include sodium hexametaphosphate (($NaPO_3)_6$) as a dispersant, and the content of the sodium hexametaphosphate in the functional layer can be 0.01 to 1% by weight, preferably, 0.01 to 0.5% by weight. The sodium hexametaphosphate is adsorbed onto the edge of the inorganic particles, in particular, plate-shaped inorganic particles, to weaken the negative charge of the edge to effectively prevent aggregation of the inorganic particles, and thus can improve storage stability of the composition for forming the functional layer and dispersibility of the inorganic particles in the functional layer.

To prepare a water-soluble composition, the solvent may be one selected from the group consisting of methanol, ethanol, propanol, butanol, methoxyethanol, ethoxyethanol, lactone, acetonitrile, n-methyl-2-pyrrolidone (NMP), formic acid, nitromethane, acetic acid, dimethyl sulfoxide, water, and combinations of two or more thereof, preferably, ethanol and water, more preferably, the ethanol and water may be mixed in a weight ratio of 1:10 to 50, but is not limited thereto.

The composition may contain 30 to 100 parts by weight of inorganic particles and 1 to 20 parts by weight of a binder based on 100 parts by weight of the solvent, and preferably, may be water-soluble (aqueous or water-based). The content of solids in the composition may be adjusted to 20 to 50% by weight, preferably, 30 to 40% by weight in consideration of the balance between processability, workability, and heat resistance. In addition, the composition may further include a certain amount of a dispersant, for example, 0.01 to 0.5 parts by weight of sodium hexametaphosphate.

The thickness of each of the functional layers formed on both sides of the laminate, that is, one side and the other side, may be the same or different. The thickness of the functional layer formed on one side or the other side of the laminate may be 1 to 10 μm. When the thickness of the functional layer is less than 1 μm, the required level of adhesion and heat resistance cannot be imparted, and when it is more than 10 μm, the separator is thickened, thereby inhibiting high capacity, miniaturization and integration of the battery or device.

Meanwhile, before applying the composition to both sides of the laminate in step (b), the laminate may be plasma-treated in the presence of a mixed gas including sulfur dioxide ($SO_2$) and oxygen ($O_2$).

Through the plasma treatment, the surfaces of the first and the second porous supports constituting the laminate and/or the surface of the internal pores can be hydrophilized to improve the bonding force between both sides of the laminate and the composition, thereby significantly improving the durability of the separator, particularly long-term durability and heat resistance.

Conventionally, a wet process in which a surface of a porous support is subjected to sulfonation by immersion in sulfuric acid or the like for a certain period of time has been mainly used in order to hydrophilize the surface, but in this case, the wet process is performed separately from the plasma process, such as before or after the plasma treatment, so that the process is complicated and a large amount of process waste liquid is generated.

In contrast, since the process gas used in the treatment of the plasma contains not only conventional air, oxygen and/or a conventional inert gas but also a certain amount of sulfur dioxide gas, it is possible to produce functional groups such as —$SO_3$ on the surface of the porous support and the surfaces of the internal pores through a single dry process, i.e. the plasma treatment, without a wet process such as immersion of a porous support in sulfuric acid or the like, that is, sulfonating, to maximize the hydrophilicity and ionic conductivity of the pore support, simplify the conventional complicated process, and is also advantageous from an environmental point of view.

The mixed gas, which is a process gas used in the plasma treatment, may include 50 to 90 vol % of sulfur dioxide and 10 to 50 vol % of oxygen, preferably 60 to 80 vol % of sulfur dioxide and 20 to 40 vol % of oxygen, more preferably 70 to 80 vol % of sulfur dioxide and 20 to 30 vol % of oxygen. When the content of sulfur dioxide in the mixed gas is less than 50 vol %, it is not possible to implement the required level of hydrophilicity for the porous support, and when it exceeds 90 vol %, the process may be unstable.

The plasma treatment may be performed for 0.5 to 90 minutes, preferably, 0.5 to 20 minutes. When the plasma treatment is performed for less than 0.5 minutes, the porous support cannot be hydrophilized and sulfonated to the required level, and when it is performed for more than 90 minutes, the hydrophilicity and the sulfonation degree may converge to a certain level to reduce process efficiency.

The laminate may be divided into two separators along the interface formed by the (c) lamination. FIG. 2C shows a cross-section of two divided separators. Referring to FIG. 2C, the laminate may be divided into a first separator including a first functional layer formed by the first coater on one surface of the first porous support and a second separator including a second functional layer formed by the second coater on one surface of the second porous support along the interface formed by the lamination.

Since steps (a) to (c) can be carried out continuously, and through this, two single-sided coating separators can be simultaneously obtained through a single coating and a drying line, not only productivity can be significantly improved, but also the physical properties of the separator can be realized at levels equal to or higher than those of the related art based on the mechanical properties, the traveling stability, and the workability of the support secured in the coating and drying line.

Separator

Another aspect of the present invention provides a separator manufactured using the method of manufacturing a separator, and a separator in which the characteristics of the separator measured according to a method including: (i) connecting one end of the separator in the machine direction (MD) to a second member in which the separator is fixed in the horizontal direction while the center of the roll around which the separator is wound is fixed to a first member; and (ii) confirming deformation of the separator after 1 hour at a temperature of 25° C. and a humidity of 40% and measuring displacement in the vertical direction according to the deformation satisfy at least one of the following conditions (1) and (2).

(1) no deformation and no vertical displacement of the separator; (2) 5 or less descending regions occur in the separator in the vertical direction, and the distance between the surface where the separator is fixed in the horizontal direction and the lowermost end of the descending region, i.e., the depth of the descending region, is 10% or less of the width in the transverse direction (TD) of the separator.

As used herein, the term "descending region" refers to a region that occurs as the separator fixed in the horizontal direction between the first and the second members is partially and/or entirely released by gravity and descends in the vertical direction to sag. The descending region may be formed in a machine direction (MD) and/or a transverse direction (TD) of the separator, and the shape and size thereof are not particularly limited.

Figure 4:
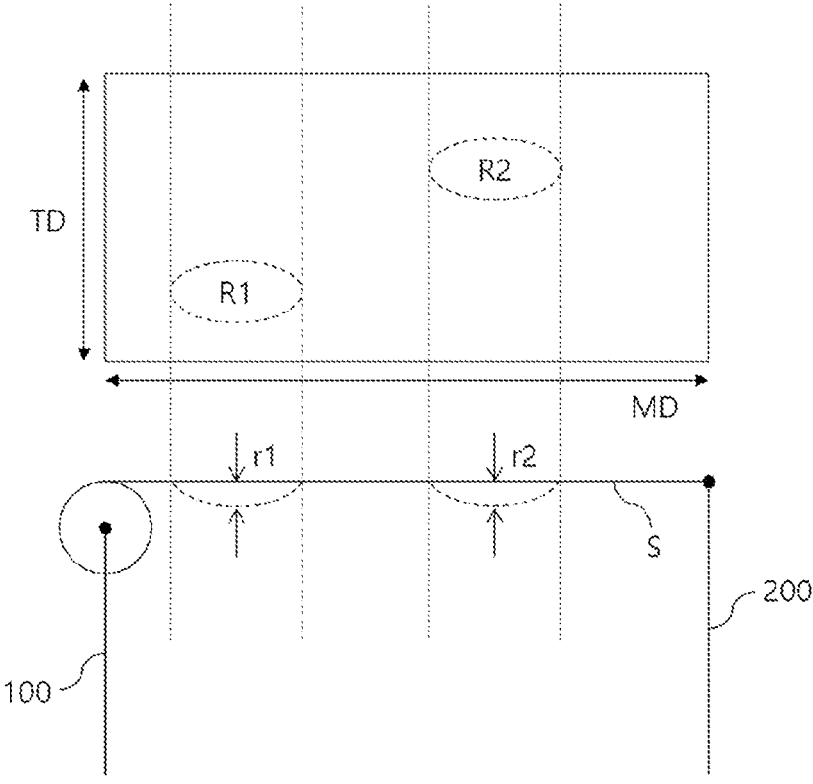
FIG. 4 shows a method for measuring and evaluating the characteristics of a separator according to another embodiment of the present invention.

FIG. 4 shows a method for measuring and evaluating characteristics of a separator according to another embodiment of the present invention. The separator may be one of the first and the second separators divided in step (c), and the composition, thickness, and action effects of the first and/or second porous support and the first and/or second coating layer and the like are the same as described above.

With increasing demand for large capacity batteries in recent years, the thickness of the porous support is also reduced to about 15 µm or less, and due to such a reduction in thickness, the mechanical properties and the resulting traveling stability of a porous support are unavoidably reduced, and thus there is a problem that deformation such as wrinkles and sagging occurs in the porous supports during application and drying of a liquid composition for forming the functional layer. When any wrinkles or sagging occurs in the separator including the porous support and the functional layer, not only the assembling property with the battery is lowered, but also the distribution of materials such as inorganic particles and binders contained in the functional layers becomes non-uniform due to the wrinkles or sagging during long-term storage, which may cause local variations in the physical properties of the separator, resulting in deterioration of the reliability of the product.

As such, in the case of a separator including the functional layer formed by coating and drying a liquid composition, it is very important to uniformly implement the smoothness, physical properties and structural stability thereof and maintain it for a long period of time.

The laminate formed by laminating the first and the second porous supports in step (a) may satisfy mechanical properties, traveling stability, and coating workability required in step (b). Specifically, in the laminate, the first and the second porous supports complement the thickness and thus the mechanical properties, so that adequate coating workability can be ensured even when a thin thickness is applied to the first or second porous support and/or the traveling speed in the coating line is increased to 80 m/min, preferably 100 m/minute or more.

Hereinafter, examples of the present specification will be described in more detail.

Preparation Example 1-1

30 parts by weight of high-density polyethylene (HDPE) having a weight average molecular weight (Mw) of 350,000 and a molecular weight distribution (Mw/Mn) of 5 and 70 parts by weight of paraffin oil having a kinematic viscosity of 70 cSt at 40° C. were mixed and put into a twin-screw extruder (inner diameter: 58 mm, L/D=56). After discharging from the twin-screw extruder to a T-die having a width of 300 mm at a screw rotation speed of 40 rpm and 200° C., it was passed through a casting roll having a temperature of 40° C. to manufacture a base sheet having a thickness of 900 µm.

The base sheet was stretched 6-fold in the machine direction (MD) in a roll stretcher at 110° C., and stretched 7-fold in the transverse direction (TD) in a tenter stretcher at 125° C. to manufacture a film. The film was immersed in a dichloromethane leaching bath at 25° C. for 1 minute to extract and remove paraffin oil, and dried at 50° C. for 5 minutes to manufacture a porous film. Thereafter, it was thermally fixed at 130° C. in the transverse direction (TD) at 10% relaxation to manufacture a porous support having a thickness of 9 µm.

Preparation Example 1-2

30 parts by weight of high-density polyethylene (HDPE) having a weight average molecular weight (Mw) of 350,000 and a molecular weight distribution (Mw/Mn) of 5 and 70 parts by weight of paraffin oil having a kinematic viscosity of 70 cSt at 40° C. were mixed and put into a twin-screw extruder (inner diameter: 58 mm, L/D=56). After discharging from the twin-screw extruder to a T-die having a width of 300 mm at a screw rotation speed of 40 rpm and 200° C., it was passed through a casting roll having a temperature of 40° C. to manufacture a base sheet having a thickness of 500 µm.

The base sheet was stretched 6-fold in the machine direction (MD) in a roll stretcher at 110° C., and stretched 7-fold in the transverse direction (TD) in a tenter stretcher at 125° C. to manufacture a film. The film was immersed in a dichloromethane leaching bath at 25° C. for 1 minute to extract and remove paraffin oil, and dried at 50° C. for 5 minutes to manufacture a porous film. Thereafter, it was thermally fixed at 130° C. in the transverse direction (TD) at 10% relaxation to manufacture a porous support having a thickness of 5 µm.

Preparation Example 1-3

30 parts by weight of high-density polyethylene (HDPE) having a weight average molecular weight (Mw) of 350,000 and a molecular weight distribution (Mw/Mn) of 5 and 70 parts by weight of paraffin oil having a kinematic viscosity of 70 cSt at 40° C. were mixed and put into a twin-screw extruder (inner diameter: 58 mm, L/D=56). After discharging from the twin-screw extruder to a T-die having a width of 300 mm at a screw rotation speed of 40 rpm and 200° C., it was passed through a casting roll having a temperature of 40° C. to manufacture a base sheet having a thickness of 400 µm.

The base sheet was stretched 6-fold in the machine direction (MD) in a roll stretcher at 110° C., and stretched 7-fold in the transverse direction (TD) in a tenter stretcher at 125° C. to manufacture a film. The film was immersed in a dichloromethane leaching bath at 25° C. for 1 minute to extract and remove paraffin oil, and dried at 50° C. for 5 minutes to manufacture a porous film. Thereafter, it was thermally fixed at 130° C. in the transverse direction (TD) at 10% relaxation to manufacture a porous support having a thickness of 4 µm.

Preparation Example 2

Carboxymethylcellulose salt (CMC), acryl-acrylonitrile copolymer latex, alumina (aluminum oxide, $Al_2O_3$), a dispersant $((NaPO_3)_6)$, a surfactant, water, and ethanol were mixed in the ratio of Table 1 below, and then dispersed with a ball-mill to prepare a water-dispersible ceramic slurry.

TABLE 1

| Classification | Input amount (g) | Solids (g) | Solid content (%) | Dry content (%) |
|---|---|---|---|---|
| Water | 1,500 | 0 | 0 | 0 |
| Ethanol | 70 | 0 | 0 | 0 |
| CMC | 27 | 27 | 100 | 3.3 |
| Acrylic-acrylonitrile copolymer latex | 70 | 31.5 | 45 | 3.9 |
| Alumina | 750 | 750 | 100 | 92.4 |
| $(NaPO_3)_6$ | 1.5 | 1.5 | 100 | 0.2 |
| Surfactant | 2 | 2 | 100 | 0.2 |
| Total | 2,421 | 812 | — | 100 |

Example 1

A laminate in which the two porous supports (first and second porous supports) according to Preparation Example 1-1 were laminated to face each other was obtained.

The water-dispersible ceramic slurry according to Preparation Example 2 was applied on both sides of the laminate, gravure-coated with a coating roll of 110 mesh, and dried at a temperature of 80° C. in a hot air oven for 1 hour to form a functional layer (heat-resistant layer) having a thickness of 3 μm on each side. The machine direction (MD) traveling speed of the laminate moving along the coating roll was 120 m/min.

The laminate was divided along the interface formed by the lamination of the laminate to manufacture a first separator having a first functional layer formed on one surface of the first porous support, and a second separator having a second functional layer formed on one surface of the second porous support.

Example 2

A laminate in which the two porous supports (first and second porous supports) according to Preparation Example 1-1 were laminated to face each other was obtained. At the time of lamination, both ends of the laminate were joined (fused) by heating both ends of the laminate corresponding to 2% of the total area of the interface of the laminate. The joined portions at both ends of the laminate are symmetrical to each other.

The water-dispersible ceramic slurry according to Preparation Example 2 was applied on both sides of the laminate, gravure-coated with a coating roll of 110 mesh, and dried at a temperature of 80° C. in a hot air oven for 1 hour to form a functional layer (heat-resistant layer) having a thickness of 3 μm on each side. The machine direction (MD) traveling speed of the laminate moving along the coating roll was 120 m/min.

Both ends joined in the laminate were cut and removed, divided along the interface formed by the lamination of the laminate to manufacture a first separator having a first functional layer formed on one surface of the first porous support, and a second separator having a second functional layer formed on one surface of the second porous support.

Example 3

First and second separators were manufactured in the same manner as in Example 1, except that a laminate in which two porous supports (first and second porous supports) according to Production Example 1-2, instead of Production Example 1-1, were laminated to face each other was applied, and the thickness of the functional layers (heat-resistant layers) formed on both sides of the laminate was changed to 2.5 μm.

Example 4

First and second separators were manufactured in the same manner as in Example 1, except that a laminate in which two porous supports (first and second porous supports) according to Production Example 1-3, instead of Production Example 1-1, were laminated to face each other was applied, and the thickness of the functional layers (heat-resistant layers) formed on both sides of the laminate was changed to 2 μm.

Comparative Example 1

The water-dispersible ceramic slurry according to Preparation Example 2 was applied onto one surface of the porous support according to Preparation Example 1-1, gravure-coated with a coating roll of 110 mesh, and dried in a hot air oven at a temperature of 80° C. for 1 hour to manufacture a separator having a functional layer (heat-resistant layer) of thickness of 3 μm formed on one side. The traveling speed in the machine direction (MD) of the porous support moving along the coating roll was 80 m/min.

Comparative Example 2

A separator was prepared in the same manner as in Comparative Example 1, except that the traveling speed in the machine direction (MD) of the porous support moving along the coating roll was changed to 100 m/min.

Comparative Example 3

A separator was prepared in the same manner as in Comparative Example 1, except that the traveling speed in the machine direction (MD) of the porous support moving along the coating roll was changed to 120 m/min.

Comparative Example 4

A separator was prepared in the same manner as in Comparative Example 1, except that the porous support according to Preparation Example 1-2 was applied instead of Preparation Example 1-1, and the thickness of the functional layer (heat-resistant layer) formed on one surface of the porous support was changed to 2.5 μm.

Comparative Example 5

A separator was prepared in the same manner as in Comparative Example 4, except that the traveling speed in the machine direction (MD) of the porous support moving along the coating roll was changed to 100 m/min.

Comparative Example 6

A separator was prepared in the same manner as in Comparative Example 1, except that the porous support according to Preparation Example 1-3 was applied instead of Preparation Example 1-1, and the thickness of the functional layer (heat-resistant layer) formed on one surface of the porous support was changed to 2 μm.

Experimental Example 1

The thickness and heat shrinkage of the separators manufactured in Examples and Comparative Examples were measured as follows. When there is no separate mention of the temperature, it was measured at room temperature (25° C.), and the results are shown in Table 2 below.

Thickness (μm): The thickness of the support specimen was measured using a micro-thickness measuring instrument.

Heat shrinkage rate (%): A separator specimen having a size of 200×200 mm was placed between A4 paper and placed in a 130° C. oven for 1 hour, and then cooled at room temperature to measure contracted lengths in transverse and machine directions of the specimen. A heat shrinkage rate was calculated according to the following equation:

$$\text{Heat shrinkage rate (\%)} = (I_3 - I_4)/I_3 * 100$$

wherein $I_3$ denotes a transversal or longitudinal length of a specimen before contraction, and $I_4$ denotes a transversal or longitudinal length of a specimen after contraction.

TABLE 2

| Classification | Thickness (Porous support) | Thickness (Functional layer) | Heat shrinkage (MD) | Heat shrinkage (TD) |
|---|---|---|---|---|
| Example 1 (First separator) | 9 | 3 | 1.7 | 1.3 |
| Example 1 (Second separator) | 9 | 3 | 1.5 | 1.3 |
| Example 2 (First separator) | 9 | 3 | 1.4 | 1.2 |
| Example 2 (Second separator) | 9 | 3 | 1.2 | 1.1 |
| Example 3 (First separator) | 5 | 2.5 | 2.1 | 1.9 |
| Example 3 (Second separator) | 5 | 2.5 | 2.3 | 2 |
| Example 4 (First separator) | 4 | 2 | 2.5 | 2 |
| Example 4 (Second separator) | 4 | 2 | 2.3 | 2.2 |
| Comparative Example 1 | 9 | 3 | 1.8 | 1.3 |
| Comparative Example 2 | 9 | 3 | 2.3 | 1.3 |
| Comparative Example 3 | 9 | 3 | 2.5 | 1.4 |
| Comparative Example 4 | 5 | 2.5 | 2.1 | 1.6 |

TABLE 2-continued

| Classification | Thickness (Porous support) | Thickness (Functional layer) | Heat shrinkage (MD) | Heat shrinkage (TD) |
|---|---|---|---|---|
| Comparative Example 5 | 5 | 2.5 | 2.1 | 1.6 |
| Comparative Example 6 | 4 | 2 | 2.4 | 1.8 |

Experimental Example 2

In a state where the center of a roll on which the separator manufactured in the above Examples and Comparative Examples was wound was fixed to a cart, one end of the separator in the machine direction (MD) was unwound in the horizontal direction, and connected to a jig for fixing the separator in a horizontal direction. (See FIG. 4).

After 1 hour at a temperature of 25° C. and a humidity of 40%, the deformation of the separator was confirmed, and the vertical displacement according to the deformation was measured. The sagging property according to the deformation of the separator were evaluated as excellent (●), good (○), and poor (X) according to the following criteria, and the results are shown in Table 3 below.

Excellent (●): When there is no deformation or vertical displacement of the separator Good (○): No more than 5 descending regions occur in the vertical direction in the separator, and the distance between the horizontally fixed surface of the separator and the lowermost end of the descending region is 10% or less of the width in the transverse direction (TD) of the separator Poor (X): When it does not correspond to Excellent or Good

TABLE 3

| Classification | Sagging property |
|---|---|
| Example 1 (First separator) | ◎ |
| Example 1 (Second separator) | ◎ |
| Example 2 (First separator) | ◎ |
| Example 2 (Second separator) | ◎ |
| Example 3 (First separator) | ◎ |
| Example 3 (Second separator) | ○ |
| Example 4 (First separator) | ◎ |
| Example 4 (Second separator) | ○ |
| Comparative Example 1 | ◎ |
| Comparative Example 2 | X |
| Comparative Example 3 | X |
| Comparative Example 4 | ○ |
| Comparative Example 5 | X |
| Comparative Example 6 | X |

The foregoing description of the present invention is intended to be illustrative, and it will be understood by those skilled in the art that embodiments can be easily modified into other specific forms without changing the spirit and essential characteristics of the invention. Therefore, it should be understood that the embodiments described above are illustrative in all respects and not restrictive. For example, each component described as a single type may be implemented in a dispersed form, and likewise components described as distributed may be implemented in a combined form.

The scope of the present invention is indicated by the following claims, and all changes or modifications derived from the meaning and scope of the claims and their equivalents should be construed as being included in the scope of the present invention.

| [Description of Marks in the Figures] | |
| --- | --- |
| 11: First porous support | 21: Second porous support |
| 12: First functional layer | 22: Second functional layer |
| 30: Interface | C: Central part of the laminate |
| E: Transverse end of the laminate | S: Separator |
| 100: First member | 200: Second member |
| R1, R2: Descent zone | r1, r2: Depth of the descending region. |

What is claimed is:

1. A method of manufacturing a separator, including:
(a) laminating a first porous support and a second porous support to obtain a laminate;
(b) forming a functional layer by applying a composition including a binder and a solvent on both sides of the laminate and drying the composition; and
(c) dividing the laminate into two separators along an interface formed by the lamination,
wherein the thickness of each of the first porous support and the second porous support is 10 $\mu$m or less, and
wherein the first porous support and the second porous support are pressed to face each other during the lamination, and both ends of the first porous support and the second porous support in the transverse direction (TD) are attached to each other by a physical means selectively applied to both ends in the transverse direction (TD) of the first porous support and the second porous support.

2. The method of claim 1, wherein the each of the first porous support and the second porous support includes one selected from the group consisting of polyethylene, polypropylene, polybutylene, polymethylpentene, ethylene vinyl acetate, ethylene butyl acrylate, ethylene ethyl acrylate, and combinations or copolymers of two or more thereof.

3. The method of claim 1, wherein the binder is one selected from the group consisting of polyvinylidene fluoride, polyvinylidene fluoride-hexafluoropropylene, polyvinylidene fluoride-trichloroethylene, polymethyl methacrylate, polyacrylonitrile, polyvinylpyrrolidone, polyvinyl acetate, ethylene vinyl acetate, polyimide, polyethylene oxide, cellulose acetate, cellulose acetate butyrate, cellulose acetate propionate, cyanoethyl pullulan, cyanoethyl polyvinyl alcohol, cyanoethyl cellulose, hydroxyethyl cellulose, cyanoethyl sucrose, pullulan, carboxymethyl cellulose, polyvinyl alcohol, polyvinyl butyral, an acrylonitrile-acrylic acid copolymer, an ethylene-acrylic acid copolymer, a styrene-butadiene copolymer, an alkyl acrylate-acrylonitrile copolymer, polyethylene glycol, acrylic rubber, and a combination of two or more thereof.

4. The method of claim 1, wherein the solvent is one selected from the group consisting of methanol, ethanol, propanol, butanol, methoxyethanol, ethoxyethanol, lactone, acetonitrile, n-methyl-2-pyrrolidone (NMP), formic acid, nitromethane, acetic acid, dimethyl sulfoxide, water, and combinations of two or more thereof.

5. The method of claim 1, wherein the composition further includes one of inorganic particles selected from the group consisting of $SiO_2$, $AlO(OH)$, $Mg(OH)_2$, $Al(OH)_3$, $TiO_2$, $BaTiO_3$, $Li_2O$, $LiF$, $LiOH$, $Li_3N$, $BaO$, $Na_2O$, $Li_2CO_3$, $CaCO_3$, $LiAlO_2$, $Al_2O_3$, $SiO$, $SnO$, $SnO_2$, $PbO_2$, $ZnO$, $P_2O_5$, $CuO$, $MoO$, $V_2O_5$, $B_2O_3$, $Si_3N_4$, $CeO_2$, $Mn_3O_4$, $Sn_2P_2O_7$, $Sn_2B_2O_5$, $Sn_2BPO_6$, and combinations of two or more thereof.

6. The method of claim 1, wherein the ratio of the area of both ends of the first porous support and the second porous support in the transverse direction (TD) to the area of the interface is 0.01 to 0.1.

7. The method of claim 6, wherein both ends of the first porous support and the second porous support in the transverse direction (TD) are cut and removed.

* * * * *